Dec. 31, 1935. G. LEVET 2,025,952
CASING HOLDING DISPLAY MATTER FOR MOTOR VEHICLES
Filed May 31, 1933 3 Sheets-Sheet 1
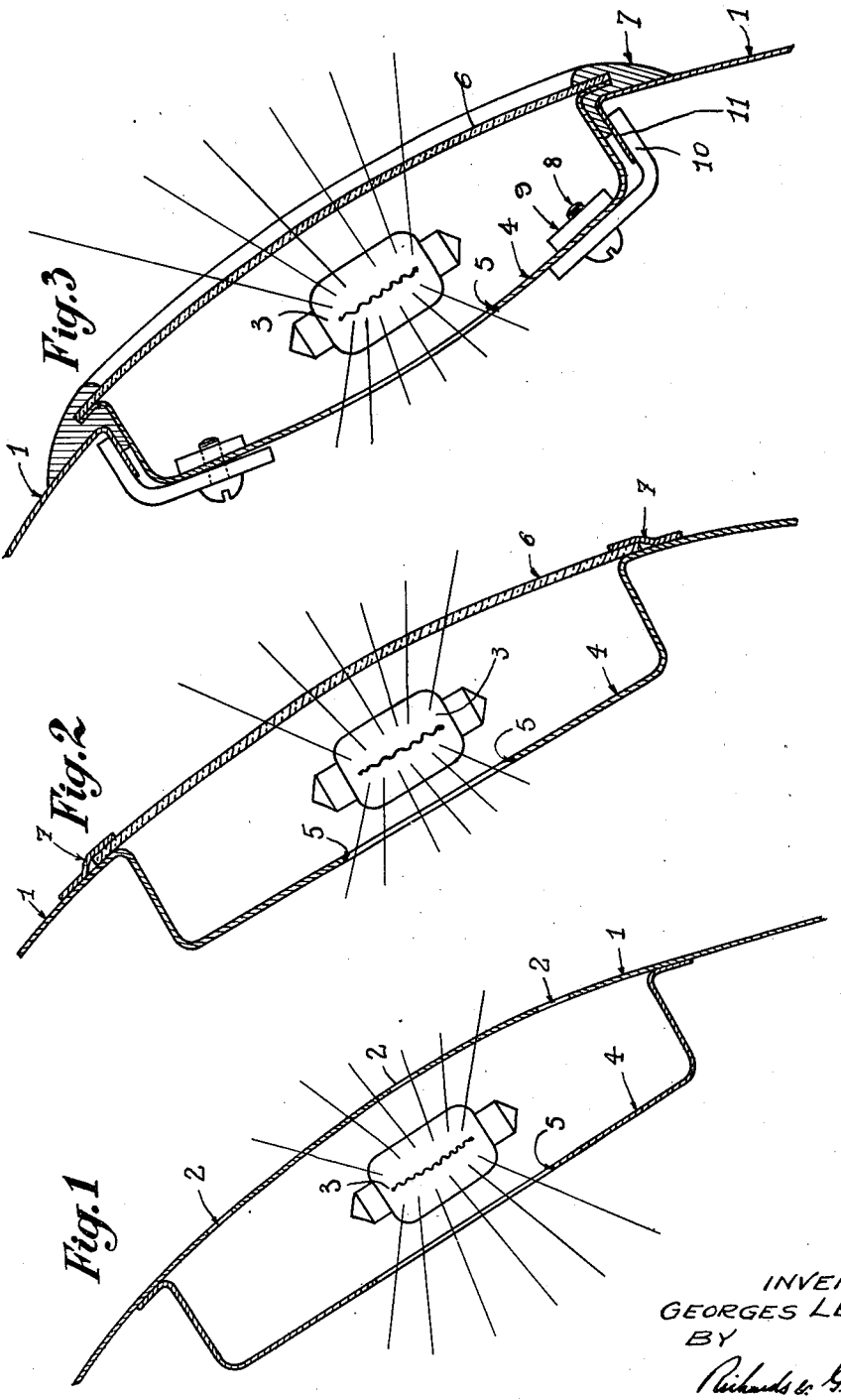
INVENTOR
GEORGES LEVET
BY
ATTORNEYS Dec. 31, 1935.　　　　　G. LEVET　　　　　2,025,952
CASING HOLDING DISPLAY MATTER FOR MOTOR VEHICLES
Filed May 31, 1933　　　3 Sheets-Sheet 2
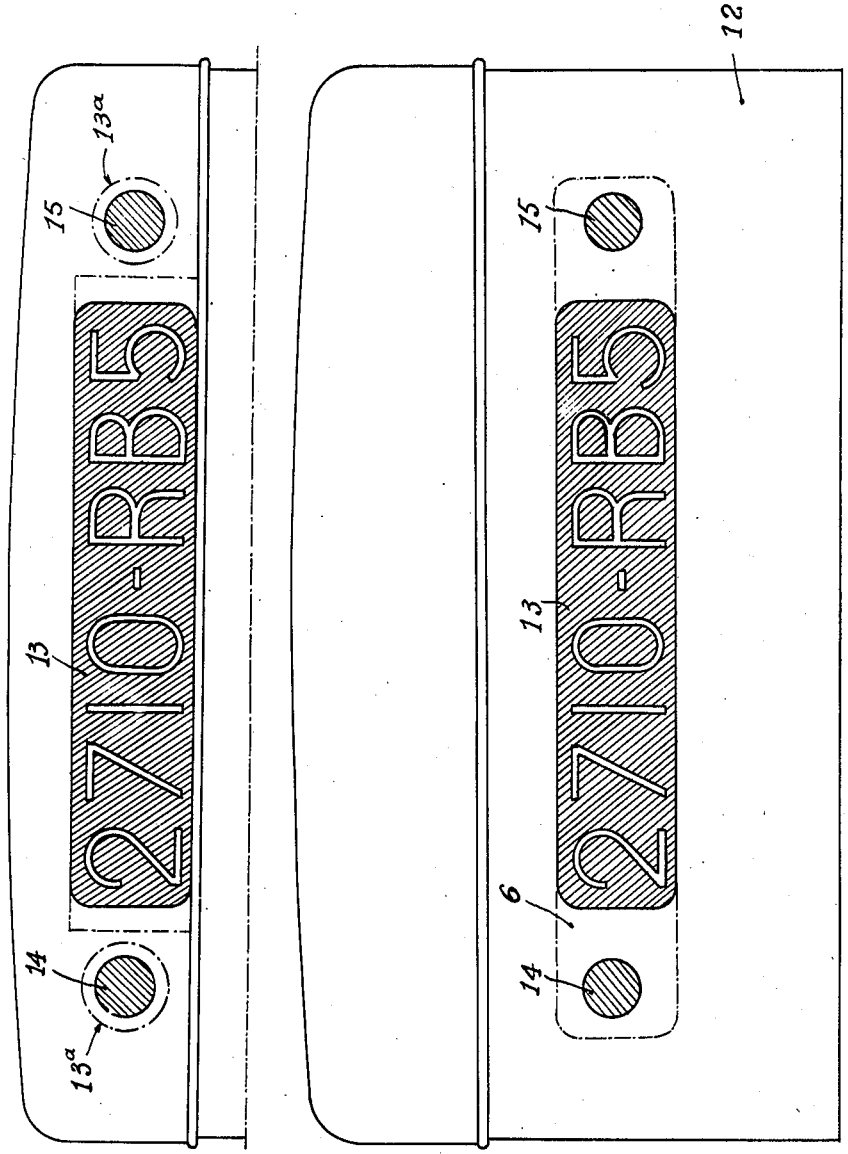
INVENTOR
GEORGES LEVET
BY
ATTORNEYS Dec. 31, 1935.  G. LEVET  2,025,952

CASING HOLDING DISPLAY MATTER FOR MOTOR VEHICLES

Filed May 31, 1933    3 Sheets-Sheet 3

INVENTOR
GEORGES LEVET
BY
ATTORNEYS

Patented Dec. 31, 1935

2,025,952

UNITED STATES PATENT OFFICE 2,025,952

CASING HOLDING DISPLAY MATTER FOR MOTOR VEHICLES

Georges Levet, Paris, France, assignor to Societe Anonyme des Usines Chausson, Seine, France Application May 31, 1933, Serial No. 673,684
In France June 8, 1932

2 Claims. (Cl. 40—132)

This invention relates to a trunk designed to be carried at the back of motor vehicles and is more particularly characterized in that the back panel of said trunk or of its lid is arranged in such a manner as to carry upon its surface and without their standing out in a marked manner various signalling devices and others such as the registered number of the vehicle, signalling lights, a searchlight for reverse driving, and the like, said devices being illuminated by means of one or of a plurality of light sources placed in the interior of the trunk or of its lid, and being eventually capable of lighting at the same time the interior of said trunk when the latter is open.

In this manner there is thus produced a back panel in which the various devices are assembled together so that the electric system is greatly simplified. On the other hand, as the outer surface of said panel does not show any perceptibly standing out parts, the appearance of the trunk is improved.

The letters, numbers and characters may be cut out in the wall of the lid itself or in the back panel, they may also be cut out in one or a plurality of plates mounted upon said wall which is provided in that case with a large corresponding opening.

The lamps are enclosed in a casing which may be mounted inside the lid behind the regulation number plate or pressed in the back panel of the trunk at such a point that the plate covers the opening of said casing when the lid is brought down.

The plate and the casing may also be fixed together upon the edges of an opening in the lid or in the back panel of the trunk.

According to an improved mode of execution they may be fixed by means of an India rubber ring or the like provided with two grooves, one of which engages the edges of the plate and of the casing and the other the edge of the back panel opening in the trunk or the lid.

The grooves are preferably formed in different directions in order to prevent the ring from leaving, through the effects of vibrations, the edges of the opening upon which it is secured.

Another object of this invention is to provide an indirect lighting system for the regulation plate and the signals, which consists essentially in providing the casing with one or more electric lamps every one of which has a reflecting screen directed towards the wall opposite to the perforated plate, said wall being reflective or rendered reflective in such a manner that the whole surface of the perforated plate is illuminated by reflected and diffused light insuring an equal visibility to all the distinctive characters upon said plate.

The appended drawings show by way of examples, various modes of execution of the present invention.

Figs. 1, 2, and 3 are vertical sectional views of various back trunk lids for motor vehicles according to the present invention.

Fig. 4 is a back view illustrating diagrammatically an improved trunk lid of the present system.

Fig. 5 is a similar view in the case when the signalling and other devices are carried upon the back panel of the trunk which may be turned down at will.

Figure 6:
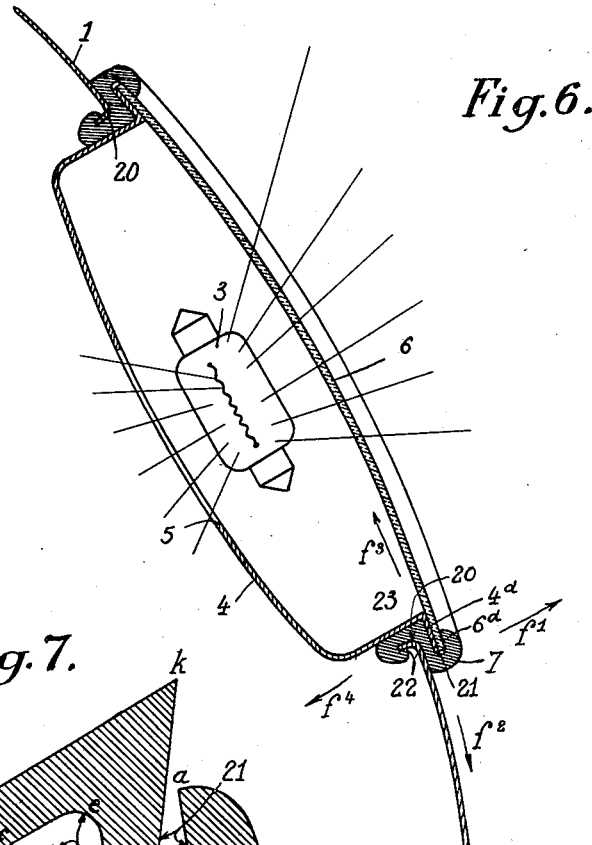
Fig. 6 is a vertical cross section of a modification of a portion of the back trunk lid.
Figure 7:
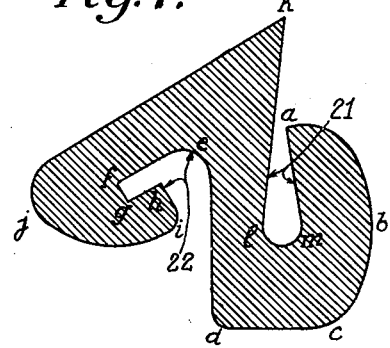
Figs. 7, 8, 9 are cross sectional views on a larger scale of the ring used for fixing the signalling means upon the lid.

In the mode of execution shown in Fig. 1, the lid 1 of the trunk of sheet metal or other suitable material is cut out at 2 so as to form openings corresponding for example to letters, digits of the registered number of the vehicle upon which the trunk is carried, and the various signaling means. These letters, numbers, signs, etc. are made visible in the day time for example by contrast between the dark cut out portions and the shade of the outer surface of the lid 1. At night and even in the day the letters, numbers and signs are made visible by means of one or a plurality of light sources 3 placed inside the lid. This source of light, or some of the light sources 3 may be coloured so as to produce signals such as the regulation red light. The source of light, or one of them may be strong enough to constitute a real tail search light which allows of illuminating the way in the rear of the vehicle when running backwards.

The light source or sources 3 are preferably placed in one or more casings 4, acting as reflectors. These casings 4 are provided with openings 5 at the back so as to light up the interior of the trunk or chest when the lid 1 has been raised.

In the mode of execution shown in Fig. 1, the casing 4 is removable and is secured by soldering, riveting or in any other suitable manner upon the the inner surface of the lid 1.

In the modification shown in Fig. 2, the casing 4 is pressed in the lid 1 and the latter is provided with a plate 6 in which letters, numbers, signs, etc. are formed by transparent or translucent portions. The plates 6 may be secured in any suitable manner, for example by means of guides 7, fixed upon the lid by screwing or in any other suitable manner. It will be evident that all signalling and other devices may be grouped in the same unit or may be separate.

Fig. 3 shows a modification in which the casing 4 and the plate 6 are removable; they may be fixed upon the lid 1 for example in the following manner: The casing 4 is secured upon metal fittings 10 by means of screws 8 and nuts 9. These fittings 10 are themselves fixed by riveting, soldering, screwing, etc., upon a flange 11 formed around the opening in the lid 1. The edges of the casing 4 are clamped in an India rubber frame 7 acting as a joint and holding at the same time the plate which carries the signals.

Figs. 4 and 5 show diagrammatically in front elevation, a trunk constructed according to the present invention. In the case illustrated in Fig 4, the various devices such as the regulation number plate, the signalling lights 14 and the spot lights 15 are carried upon the lid; this diagram corresponding to the sectional views in Figs. 2 and 3. In the case of Fig. 5, all these devices are carried upon the rear wall 12 of the chest. It will be noted that the lights 14, 15 may be carried by the same plate 13 as shown in Fig. 5 or by independent means 13ª as in Fig. 4.

All the devices hereinbefore described prevent any tampering with the regulation plate and other signalling means in so far that the lock would have to be broken open to take them out.

In the modification shown in Fig. 6, a large opening 20 is cut in the sheet metal wall 1. This opening is designed to receive the signalling plate 6 and the casing 4, the latter containing one or more light sources 3 designed to illuminate by transparency the plate 6 and also the interior of the chest or trunk through an opening 5 in said casing 4.

The casing 4 and the plate 6 are fixed upon the wall 1 by means of a ring 7 of India rubber or any similar elastic material.

The ring 7 is provided around its circumference with two grooves 21, 22, substantially opposite one another. The groove, 21, engages the edges 6ª of the plate 6 and 4ª of the casing 4, and the groove, 22, engages the edge 23 of the opening 20 in panel 1.

The groove 21 is limited by two flat surfaces having a section $kl$ and $am$, connected at $lm$. The side $ke$ is inclined relatively to the side $km$ so that the beginning at $a$ of the groove 21 is restricted. Consequently the adjustment of the edges 4ª, 6ª of the casing 4 and of the plate $l$ requires the opening of the groove. The portion $db$ of ring 7 must be distorted. It presses consequently against the unit 4ª—6ª which therefore does not have any play in its recess 21.

The groove 22 has an L-shaped or other similar section $d, e, f, g, h, i$. The portion $e f g h$ forming a recess for the flange 23 of the panel 1 and being folded at 90° approximately.

The surface $kj$ of the ring acts as a bearing for the sides of the casing 4, the surface $e\ d$ bearing against the outer surface of the panel 1.

The adjustment of the whole device upon the ring 1 is executed in the following manner. Said ring is first engaged in the opening 20 by introducing the flange 23 of the panel in the groove 22, the edges 4ª, 6ª of the casing 4 and of plate 6 being then engaged in the groove 21. These operations are made possible owing to the elastic distortion of the ring 7.

It will be seen that when these operations have been executed the casing 4 and the plate 6 are perfectly secured in position without the aid of any supplementary part.

In fact it is to be remarked that owing to the L-shape of the groove 22, the unit 4—6—7 cannot move away from the panel 1 in the direction shown by the arrow $f^1$ (as shown in Fig. 6) the flange 23 of the panel locking the ring 7, by the surface $f\ g$ of the groove 22.

In the same manner, all movements in the direction indicated by the arrows $f^2$, $f^3$ are prevented owing to the engagement either of the flange 23 with the surface of section $e\ f$, or of the flanges 4ª, 6ª with the surface of section $l\ m$. Lastly, any displacement in the direction of the arrow $f^4$ is prevented by the engagement of the panel 1 with the surface of section $e\ d$.

Figure 8:
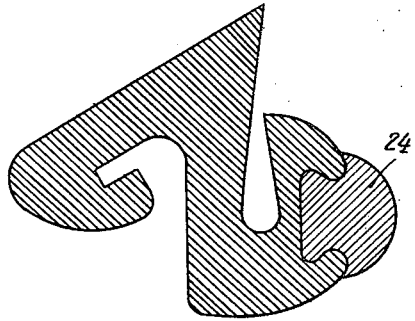
Figure 9:
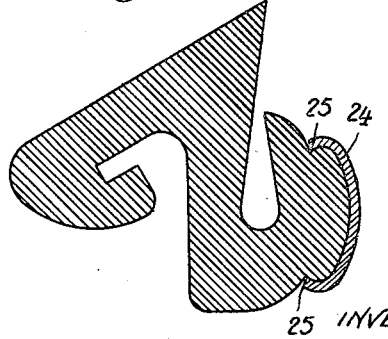

It will be noted that the outer surface, of curvilinear or polygonal section $a, b, c$, which constitutes a kind of boss will serve to engage a frame or circular part 24 (Figs. 8 and 9) of any suitable metal (copper, chromium or nickel metal) or material capable of improving the appearance of the whole. The part 24 may be secured in any suitable manner either by being let in the ring 7 (Fig. 8) or by the intermediary of spurs 25 (Fig. 9) surrounding the ring 7. This frame being rigid will still reinforce the resistance of the fixture by preventing every local distortion of the ring 7.

While I have shown and described the preferred embodiments of my device, it will be understood that various modifications in the details of construction may be made without departing from the spirit and scope of the invention as defined in the claims.

What I claim and desire to secure by Letters Patent of the United States is:

1. In combination a wall provided with an opening, an India rubber ring provided with a groove to fit upon the edges of said opening, and with a second angular groove in an opposite direction to the first-mentioned groove, a p'ate carrying certain display matter, a casing behind said plate, the edges of the latter and of the casing being forcibly engaged in the second groove, and lamps inside said casing to illuminate said display matter.

2. In combination a wall provided with an opening, an India rubber ring provided with a groove to fit upon the edges of said opening, and with a second angular groove in an opposite direction to the first-mentioned groove; a stiffening and decorative frame fixed upon the outer surface of said ring, a plate carrying certain display matter, a casing behind said plate, the edges of the latter and of the casing being forcibly engaged in the second groove, and lamps inside said casing to illuminate said display matter.

GEORGES LEVET.